United States Patent
Birkestrand et al.

(10) Patent No.: US 7,627,506 B2
(45) Date of Patent: Dec. 1, 2009

(54) METHOD OF PROVIDING METERED CAPACITY OF TEMPORARY COMPUTER RESOURCES

(75) Inventors: Daniel Charles Birkestrand, Rochester, MN (US); Randall Lane Grimm, Rochester, MN (US); David Otto Lewis, Rochester, MN (US); Terry Lyle Schardt, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 904 days.

(21) Appl. No.: 10/616,676

(22) Filed: Jul. 10, 2003

(65) Prior Publication Data

US 2005/0010502 A1  Jan. 13, 2005

(51) Int. Cl.
G07F 19/00 (2006.01)
G06F 15/167 (2006.01)
G06F 15/173 (2006.01)

(52) U.S. Cl. .................. 705/34; 709/215; 709/226
(58) Field of Classification Search .................. 705/34; 709/215, 226
See application file for complete search history.

(56) References Cited

U.S. PATENT DOCUMENTS

| | | | |
|---|---|---|---|
| 5,745,879 A | 4/1998 | Wyman | |
| 5,956,505 A | 9/1999 | Manduley | |
| 6,058,423 A | 5/2000 | Factor | |
| 6,061,504 A | 5/2000 | Tzelnic et al. | |
| 6,061,732 A | 5/2000 | Korst et al. | |
| 6,230,200 B1 | 5/2001 | Forecast et al. | |
| 6,301,616 B1 | 10/2001 | Pal et al. | |
| 6,460,082 B1 | 10/2002 | Lumelsky et al. | |
| 6,584,489 B1 * | 6/2003 | Jones et al. ................. | 718/104 |
| 6,625,750 B1 | 9/2003 | Duso et al. | |
| 7,039,784 B1 | 5/2006 | Chen et al. | |
| 7,146,496 B2 * | 12/2006 | Circenis et al. ............. | 713/100 |
| 7,155,735 B1 | 12/2006 | Ngo et al. | |
| 7,322,034 B2 | 1/2008 | Crawford, Jr. et al. | |

(Continued)

FOREIGN PATENT DOCUMENTS

JP  2001-331333  11/2001

(Continued)

OTHER PUBLICATIONS

Friedmann, "Wie gut sind Capacity-on-Demand-Angebote?" Feb. 13, 2003, pp. 1-6.

(Continued)

Primary Examiner—Matthew S Gart
Assistant Examiner—Scott A Zare
(74) Attorney, Agent, or Firm—Martin & Associates, LLC (57) ABSTRACT

An apparatus and method provides the capability of metering temporary capacity on demand in a computer system. A resource-time is specified, such as processor-days. The actual usage of the resource is monitored, and the customer is charged for only the actual usage of the resource. In this manner a customer may purchase a specified resource-time, and is only charged for the time that the resource is actually used. The preferred embodiments extend to metering temporary capacity on demand in a logically partitioned computer system. If a resource is shared, the actual usage of the resource is monitored, and the customer is only billed for actual usage that exceeds a predetermined non-zero threshold.

2 Claims, 7 Drawing Sheets

U.S. PATENT DOCUMENTS

| | | |
|---|---|---|
| 2002/0013802 A1* | 1/2002 | Mori et al. .................... 709/1 |
| 2002/0016842 A1* | 2/2002 | Eki ............................ 709/226 |
| 2002/0124168 A1 | 9/2002 | McCown et al. |
| 2002/0156824 A1* | 10/2002 | Armstrong et al. .......... 709/104 |
| 2002/0161891 A1* | 10/2002 | Higuchi et al. .............. 709/226 |
| 2002/0166117 A1* | 11/2002 | Abrams et al. ............... 717/177 |
| 2002/0178206 A1* | 11/2002 | Smith ......................... 709/102 |
| 2002/0178387 A1 | 11/2002 | Theron |
| 2003/0018870 A1 | 1/2003 | Abboud et al. |
| 2003/0028653 A1* | 2/2003 | New et al. ................... 709/229 |
| 2003/0093528 A1* | 5/2003 | Rolia ......................... 709/226 |
| 2003/0135580 A1* | 7/2003 | Camble et al. .............. 709/216 |
| 2004/0088412 A1 | 5/2004 | John et al. |
| 2004/0111308 A1 | 6/2004 | Yakov |
| 2004/0148511 A1* | 7/2004 | Circenis et al. ............. 713/187 |
| 2004/0194089 A1 | 9/2004 | McCarthy et al. |
| 2004/0199632 A1* | 10/2004 | Romero et al. .............. 709/226 |
| 2004/0215748 A1* | 10/2004 | Boonie et al. ............... 709/220 |
| 2004/0255048 A1 | 12/2004 | Lev Ran et al. |
| 2005/0010502 A1 | 1/2005 | Birkestrand et al. |
| 2005/0015343 A1 | 1/2005 | Nagai et al. |
| 2005/0246705 A1 | 11/2005 | Etelson et al. |
| 2005/0268063 A1 | 12/2005 | Diao et al. |
| 2006/0100962 A1 | 5/2006 | Wooldridge et al. |
| 2006/0190615 A1 | 8/2006 | Panwar et al. |
| 2006/0294238 A1 | 12/2006 | Naik et al. |

FOREIGN PATENT DOCUMENTS

| | | |
|---|---|---|
| JP | 2002-024192 | 1/2002 |
| TW | 439031 A4 | 6/2001 |
| WO | WO 02086698 | 10/2002 |

OTHER PUBLICATIONS

U.S. Appl. No. 10/406,652, "Method to Provide On-Demand Resource Access," Daniel C. Birkestrand et al., filed Apr. 3, 2003.

iSeries Model 840 Manual, "V5R1 Planning Guide for Capacity Upgrade on Demand", Oct. 10, 2001, pp. 1-29.

iSeries Model 830 Manual, "V5R1 Planning Guide for Capacity Upgrade on Demand", Oct. 10, 2001, pp. 1-30.

IBM eServer iSeries 400 Presentation, "Capacity Upgrade on Demand", Oct. 3, 2000.

Katharina Friedmann, "How good are Capacity-on-Demand Offers?", www.Computerwoche.de, Feb. 2, 2003.

Chase, Jeffrey S. et al, "Dynamic Virtual Clusters in a Grid Site Manager", Proceedings of the 12th IEEE International Symposium on High Performance Distributed Computing (HPDC'03), Jun. 2003.

Figueiredo, Renato J. et al, "A Case for Grid Computing on Virtual Machines", May 2003.

* cited by examiner

METHOD OF PROVIDING METERED CAPACITY OF TEMPORARY COMPUTER RESOURCES

RELATED APPLICATION

This patent application is related to U.S. patent application "METHOD TO PROVIDE ON-DEMAND RESOURCE ACCESS", Ser. No. 10/406,652 filed on Apr. 3, 2003, which is incorporated herein by reference.

BACKGROUND OF THE INVENTION

1. Technical Field

This invention generally relates to data processing, and more specifically relates to utilization of resources in a computer system.

2. Background Art

Since the dawn of the computer age, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

One problem with computer systems today is balancing the cost of the computer hardware with fluctuating demands on computer resources. In most networked computer systems, there are times when the computing demands are relatively low, and other times when the computing demands are very high. If a company purchases a computer system that is capable of meeting peak demand, much of the capacity of the computer system will go unused during non-peak times. In addition, purchasing capacity to meet peak demand is costly. If a company purchases a computer system that is capable of meeting average demand, the cost is lower, but the performance of the computer system suffers during peak times.

One way to provide a more flexible solution allows a computer user to buy a computer system that has some resources installed, but initially disabled. When the customer determines that more capacity is needed, the customer may enter into an arrangement with the provider of the computer system to enable certain resources for a fixed period of time. This works out particularly well for companies that have seasonal peaks. The companies can purchase a computer system at a reasonable cost that has the capability of providing enhanced computing power during the peak season. The concept of providing temporary capacity on demand is the subject matter of the related patent application "Method to Provide On-Demand Resource Access", Ser. No. 10/406,652, filed on Apr. 3, 2003.

Figure 2:
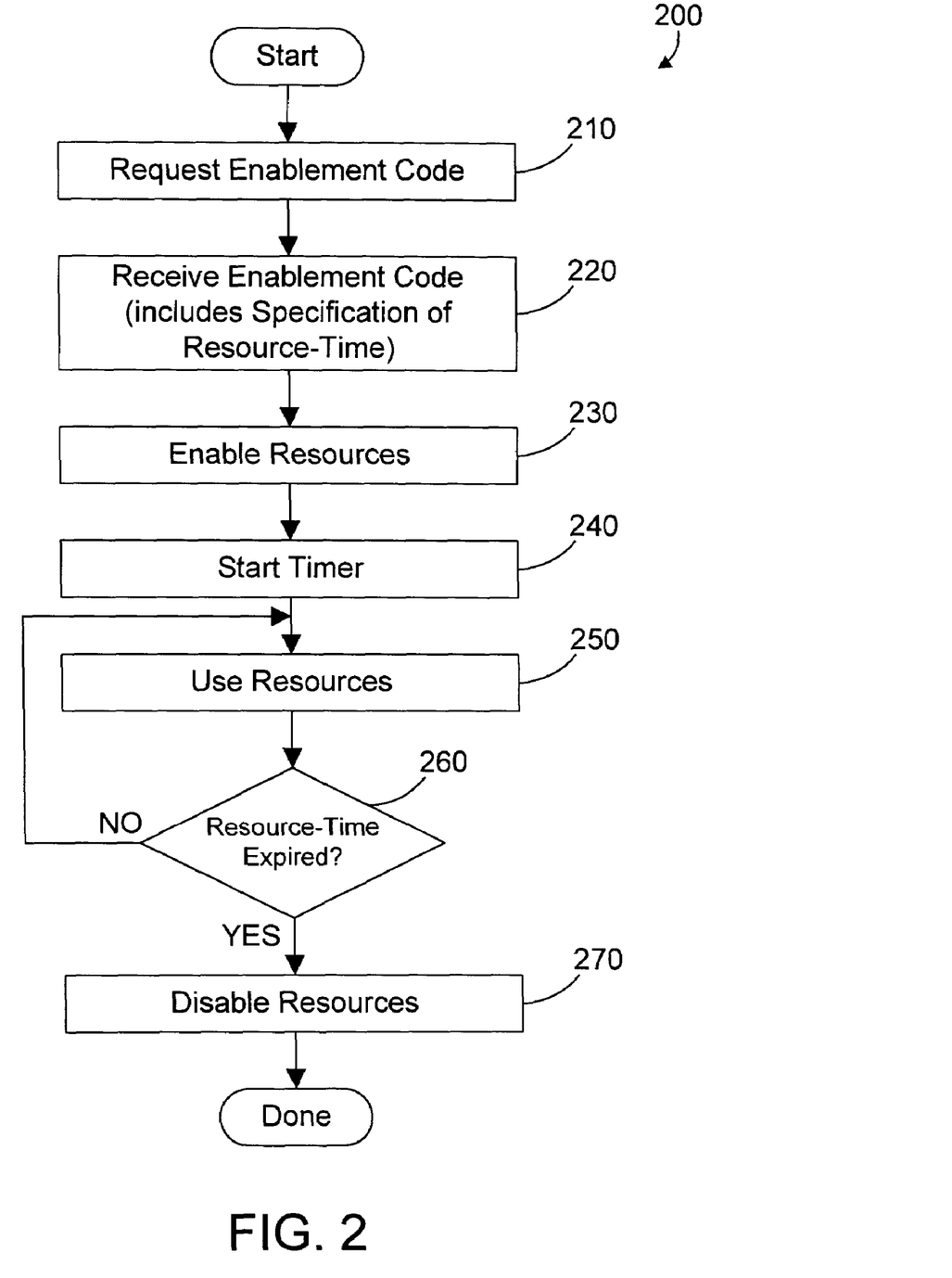
FIG. 2 is a flow diagram of a method for providing temporary capacity on demand.

Referring to FIG. 2, a flow diagram of one suitable method 200 for providing temporary capacity on demand begins by the customer requesting an enablement code from the manufacturer (step 210). The customer receives the enablement code, which includes a specification of resource-time (step 220). The term "resource-time" is a general term that allows specifying any resource or combination of resources for any suitable period of time. One example of resource-time is processor-days. The customer enters the enablement code, which enables the resources on the computer system (step 230). A timer is then started (step 240). The user may then use the resources (step 250) as long as the resource-time has not expired (step 260=NO). Once the resource-time expires (step 260=YES), the resources are disabled (step 270).

A simple example will show the usefulness of method 200. Let's assume that a company that sells goods via catalog sales experiences peak demand in November and December of each year due to holiday shopping. The company could purchase a computer system that has one or more additional processors that are installed but initially disabled. The company may then contract with the provider of the computer system to enable the additional processor(s) for a set period of time. Let's assume that the computer system has two additional processors, and let's assume that the peak buying period runs for the thirty day period from November $15^{th}$ to December $14^{th}$. The customer could purchase sixty processor-days of additional capacity beginning on November $15^{th}$. These two additional processors will then be enabled for the thirty day period (providing the sixty processor-days of additional capacity). Once the sixty processor-days have elapsed, the two additional processors are disabled.

One problem with method 200 is the customer pays for the resource-time even though the resources may be used only a fraction of that time. For example, if the additional processors are used primarily during the eight hour day shift, the customer ends up paying for capacity that goes mostly unused during the other two shifts. In the example above, if the customer purchases sixty processor-days, and two processors are being enabled, these two processors are enabled for exactly thirty days regardless of workload during that time. While this is a vast improvement over prior systems that do not provide temporary capacity on demand, it still has its drawbacks.

Without a way to provide temporary capacity on demand in a way that allows customers to pay for only the actual use of temporary resources, the computer industry will not be able to meet the demands of customers who prefer to pay for temporary resources based on actual usage.

DISCLOSURE OF INVENTION

An apparatus and method provides the capability of metering temporary capacity on demand in a computer system. A resource-time is specified, such as processor-days. The actual usage of the resource is monitored, and the customer is charged for only the actual usage of the resource. In this manner a customer may purchase a specified resource-time, and is only charged for the time that the resource is actually used. The preferred embodiments extend to metering temporary capacity on demand in a logically partitioned computer system. If a resource is shared, the actual usage of the resource is monitored, and the customer is only billed for actual usage that exceeds a predetermined non-zero threshold.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

Figure 1:
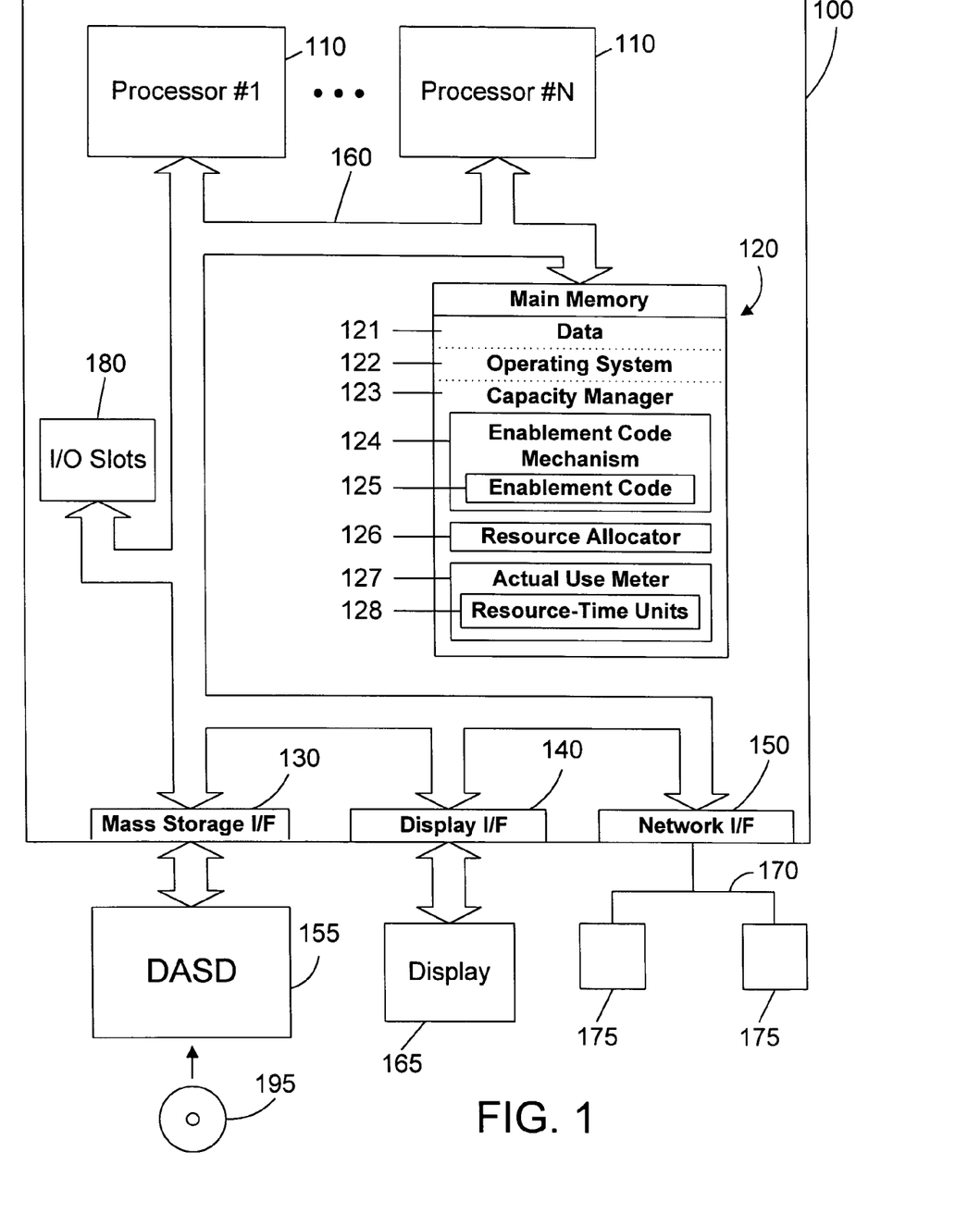
FIG. 1 is a block diagram of a computer apparatus in accordance with the preferred embodiments.

Referring to FIG. 1, a computer system 100 is an enhanced IBM eServer iSeries computer system, and represents one suitable type of computer system in accordance with the preferred embodiments. Those skilled in the art will appreciate that the mechanisms and apparatus of the present invention apply equally to any computer system. As shown in FIG. 1, computer system 100 comprises one or more processors 110 connected to a main memory 120, a mass storage interface 130, a display interface 140, a network interface 150, and a plurality of I/O slots 180. These system components are interconnected through the use of a system bus 160. Mass storage interface 130 is used to connect mass storage devices (such as a direct access storage device 155) to computer system 100. One specific type of direct access storage device is a CD RW drive, which may read data from a CD R.W. 195. Note that mass storage interface 130, display interface 140, and network interface 150 may actually be implemented in adapters coupled to I/O slots 180.

Main memory 120 contains data 121, an operating system 122, and a capacity manager 123. Data 121 is any data that may be read or written by any processor 110 or any other device that may access the main memory 120. Operating system 122 is a multitasking operating system, such as OS/400, AIX, or Linux; however, those skilled in the art will appreciate that the spirit and scope of the present invention is not limited to any one operating system. Any suitable operating system may be used. Operating system 122 is a sophisticated program that contains low-level code to manage the resources of computer system 100. Some of these resources are processor 110, main memory 120, mass storage interface 130, display interface 140, network interface 150, system bus 160, and I/O slots 180.

Capacity manager 123 provides metered capacity on demand. The capacity manager 123 includes an enablement code mechanism 124, which is used to determine whether an enablement code 125 is valid, and to enable one or more resources when the enablement code is determined to be valid. The resource allocator 126 is the mechanism that allocates resources for use. Thus, when the enablement mechanism 124 determines that an enablement code 125 is valid, the resource allocator 126 makes the corresponding resource(s) available for use. Capacity manager 123 also includes an actual use meter 127 that measures usage in resource-time units 128. In a first embodiment, the actual use meter tracks actual usage in resource-time units, and the customer is then billed for the actual usage. In a second embodiment, the actual use meter has a prepaid number of resource-time units, and the actual use is deducted from the prepaid resource-time units until the prepaid resource-time units are exhausted.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, data 121, operating system 122, and capacity manager 123 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up the operating system 122.

Although computer system 100 is shown to contain only a single system bus, those skilled in the art will appreciate that the present invention may be practiced using a computer system that has multiple buses. In addition, the I/O interfaces that are used in the preferred embodiment each may include separate, fully programmed microprocessors that are used to off-load compute-intensive processing from processor 110, as in iSeries input/output processors, or may be simple industry standard I/O adapters (IOAs).

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer readable signal bearing media used to actually carry out the distribution. Examples of suitable signal bearing media include: recordable type media such as floppy disks and CD RW (e.g., 195 of FIG. 1), and transmission type media such as digital and analog communications links.

Figure 3:
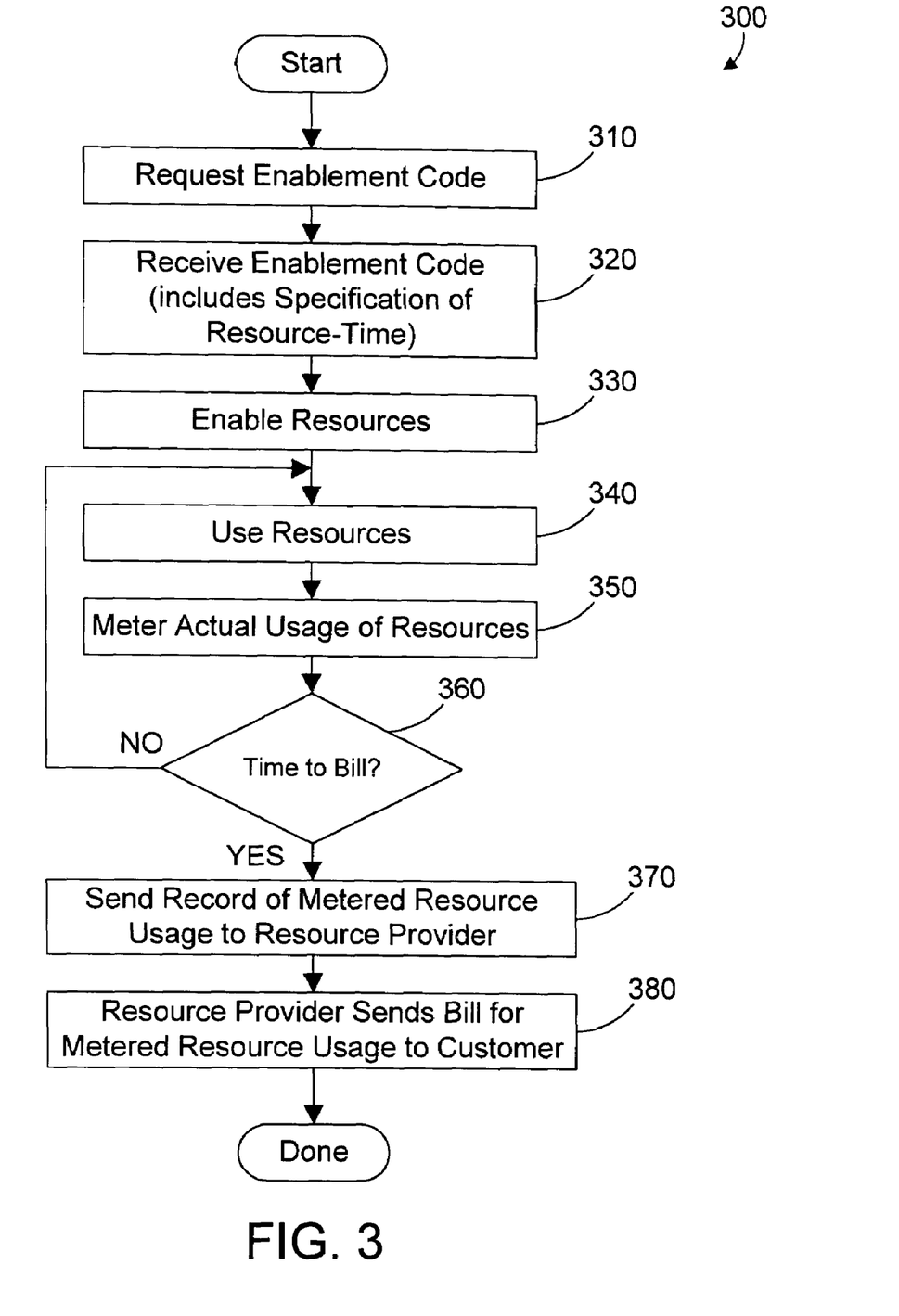
FIG. 3 is a flow diagram of a first method in accordance with the preferred embodiments that allows a customer to be billed for metered usage of temporary resources.

Referring now to FIG. 3, a method 300 in accordance with a first embodiment bills a customer for actual use of temporary resources in a computer system. First, the customer requests an enablement code (step 310). The provider of the computer system sends the enablement code to the customer (step 320). Note that the enablement code includes a specification of resource-time. The resources specified in the enablement code are then enabled (step 330). The customer may then use the resources (step 340). The actual usage of the resources is metered (step 350). The usage of resources in step 340 and metering of actual usage in step 350 continues as long as it is not time to bill (step 360=NO). Once it is time to bill (step 360=YES), a record of metered resource usage is sent to the resource provider (step 370), and the resource provider then sends a bill to the customer for the metered resource usage (step 380). The advantage of method 300 when compared to method 200 in FIG. 2 is the customer is only charged for the actual usage of the resources. Thus, if two processors are enabled for sixty processor-days, and the two processors are used on average only eight hours of each twenty four hour day, the sixty processor days will last for a total of ninety days instead of the thirty days provided by method 200 in FIG. 2. Two processors times ⅓ of a day usage per calendar day equals ⅔ of a processor day per calendar day. Because only ⅔ of a processor day is expended per calendar day, the sixty processor days will last for ninety calendar days instead of the thirty calendar days that would result using method 200 in FIG. 2. In addition, method 300 may include the ability to bill at a higher rate for a predetermined resource-time (such as sixty processor-days), then bill at a lower rate once the predetermined resource-time has been used.

The record of metered resource usage may be sent to the provider via any suitable carrier. In a manual example, the customer queries the computer system to determine metered usage, and reports the metered usage on a form that is sent or faxed to the resource provider. In an automatic example, the capacity manager automatically sends the record of metered usage to the provider via the Internet, and the customer is then billed for the metered usage. Of course, other combinations and variations are possible, all of which are within the scope of the preferred embodiments.

Another option is to allow the customer to prepay for a predetermined amount of resource-time, and to deduct actual usage from the prepaid amount. This is similar to a prepaid phone card that has a specified number of minutes, and deducts from the total as minutes are used. One implementation of a prepaid method is shown as method 400 in FIG. 4. The customer prepays for a specified resource-time (step 410). The customer then requests an enablement code for the prepaid resource-time (step 420). The resource supplier then provides the enablement code to the customer (step 430), which includes a specification of prepaid resource-time. The resources are then enabled (step 440) and used (step 450). The actual usage of the resources is metered (step 460), and deducted from the prepaid resource-time. Steps 450 and 460 continue as long as the metered use is less than the prepaid resource-time (step 470=YES). Once the metered use is no longer less than the prepaid resource time (step 470=NO), the resources are disabled (step 480).

Figure 4:
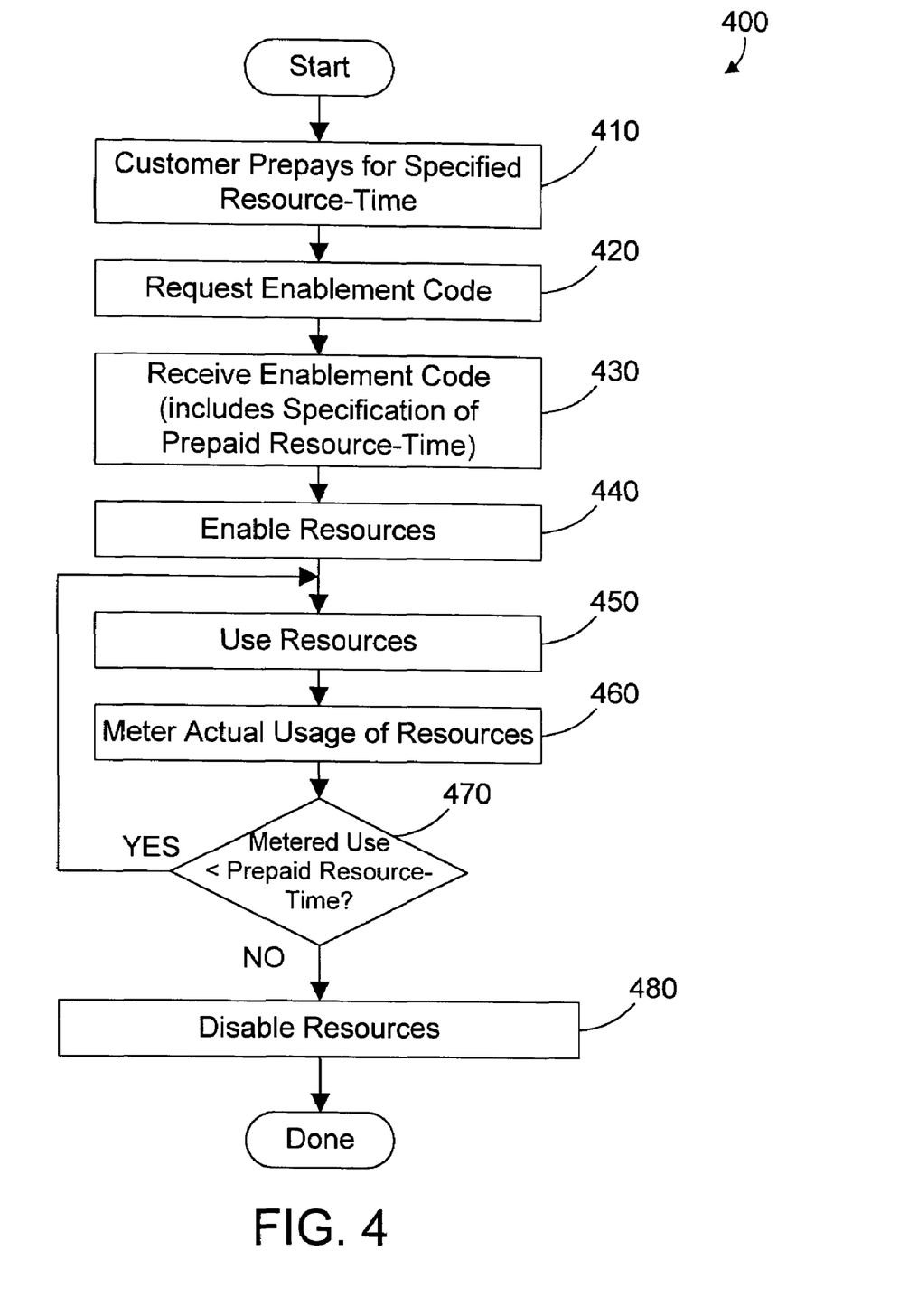
FIG. 4 is a flow diagram of a second method in accordance with the preferred embodiments that allows a customer to prepay for metered usage of temporary resources.

A modification to method 400 in FIG. 4 within the scope of the preferred embodiments is the ability to renew the prepaid resource-time. Thus, if the prepaid resource time gets to some predetermined threshold (e.g., 20% of initial amount), the customer could be prompted to prepay for additional resource-time. If the customer does so before the prepaid resource-time is used up, the additional resource-time is added to the remaining balance, allowing the computer system to continue operating with the additional resources without interruption.

Figure 5:
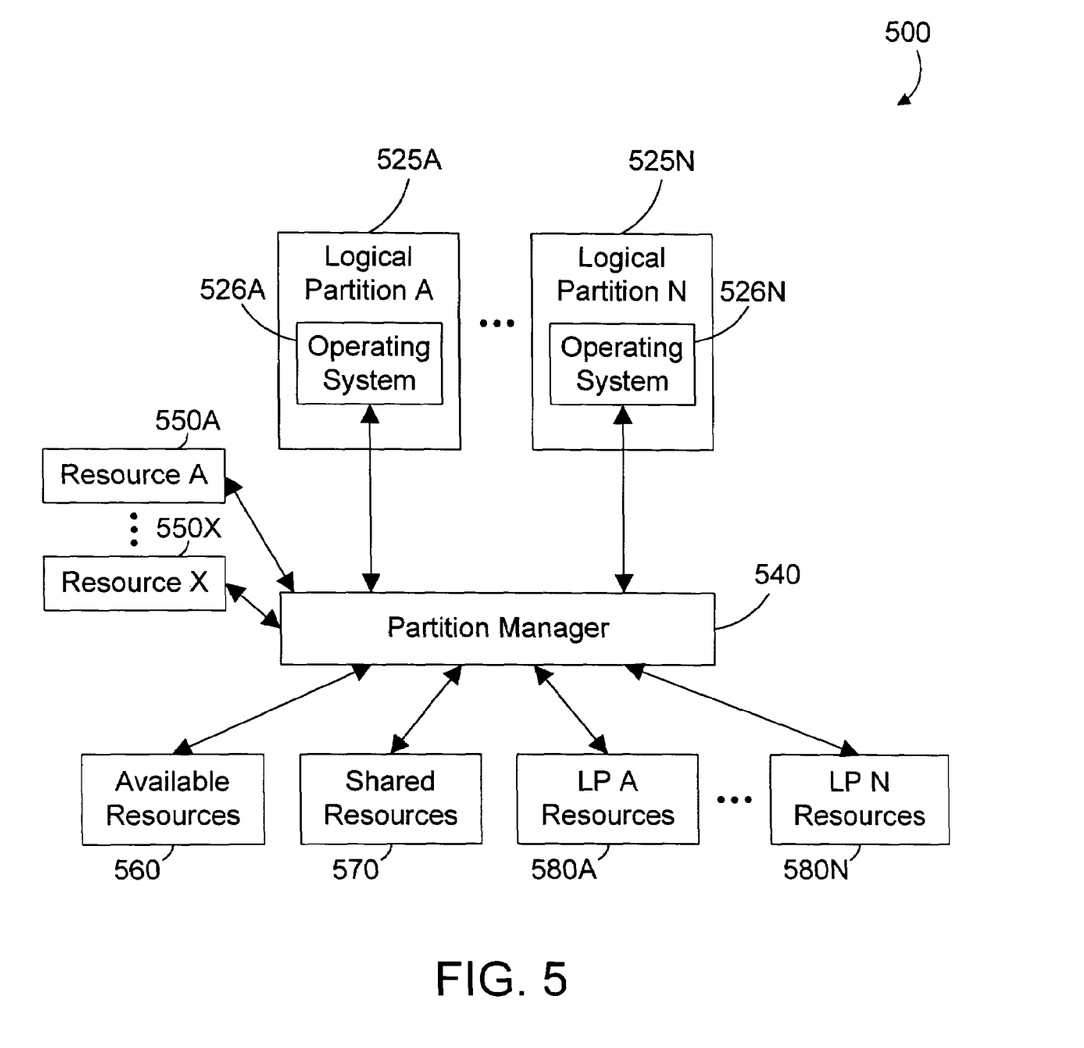
FIG. 5 is a block diagram showing logical components in a logically partitioned computer system.

While the examples discussed with reference to FIGS. 1, 3 and 4 above do not have logical partitions, the preferred embodiments also extend to a logically partitioned computer system. Referring to FIG. 5, one specific implementation of a logically partitioned computer system 500 includes N logical partitions, with each logical partition executing its own respective operating system 526. In FIG. 5, logical partitions 525A . . . 525N are shown executing their respective operating systems 526A . . . 526N. The operating system 526 in each logical partition may be the same as the operating system in other partitions, or may be a completely different operating system. Thus, one partition can run the OS/400 operating system, while a different partition can run another instance of OS/400, possibly a different release, or with different environment settings (e.g., time zone). The operating systems in the logical partitions could even be different than OS/400, provided it is compatible with the hardware (such as AIX or Linux). In this manner the logical partitions can provide completely different computing environments on the same physical computer system.

The logical partitions are managed by a partition manager 540. One example of suitable partition manager 540 is known as a "hypervisor" in IBM terminology. Partition manager 540 manages resources 550, shown in FIG. 5 as resource 550A through resource 550x. A "resource" in this context may be any hardware or software that may be controlled by partition manager 540. Examples of hardware resources include processors, memory, and hard disk drives. Examples of software resources include a database, internal communications (such as a logical LAN), or applications (such as word processors, e-mail, etc.). The partition manager 540 controls which resources 550 may be used by the logical partitions 525. A resource, once made available to the partition manager 540, is categorized as an available resource 560 if it has not yet been assigned to a logical partition, is categorized as a shared resource 570 if multiple logical partitions may access the resource, and is categorized as a dedicated resource 580 if it has been exclusively assigned to a logical partition. FIG. 5 shows dedicated resources 580A . . . 580N that correspond to each logical partition 525A . . . 525N.

Figure 6:
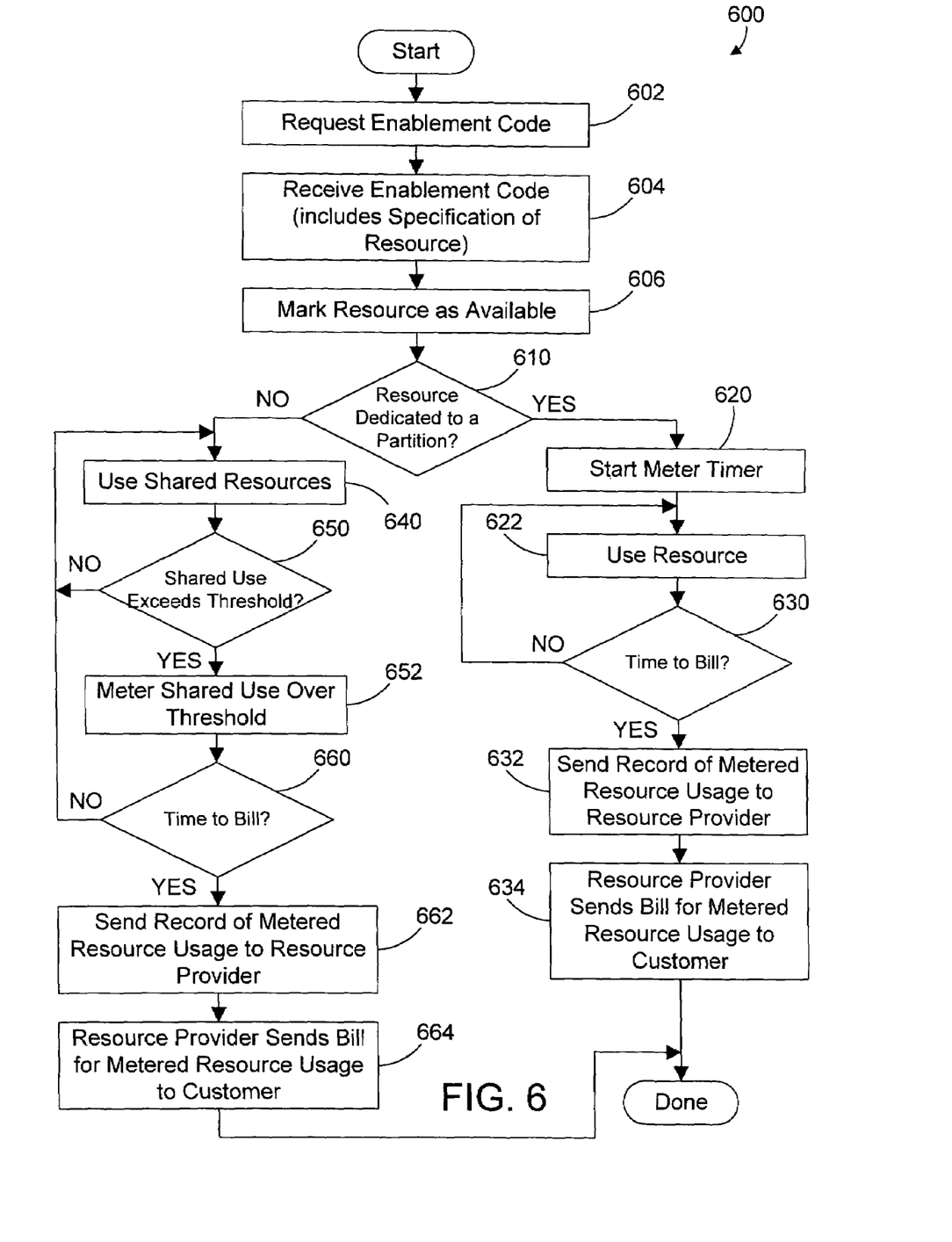
FIG. 6 is a flow diagram of a third method in accordance with the preferred embodiments that allows a customer to be billed for metered usage of temporary resources in a logically partitioned computer system.

Referring to FIG. 6, a method 600 in accordance with the preferred embodiments begins when a customer requests an enablement code for a temporary resource on a computer system that includes logical partitions (step 602). The computer supplier provides the enablement code to the customer, which includes a specification of which resource to enable (step 604). The resource is then marked as available (step 606). This means that the resource is placed in the pool of available resources 560 that have not yet been assigned to any logical partition. What happens next depends on whether the resource is then allocated by the partition manager as a dedicated resource to a particular partition, or whether the resource is allocated for shared use (step 610). If the resource is to be a dedicated resource to a logical partition (step 610=YES), a meter timer is started (step 620) and the resource is used (step 630). This continues (step 630=NO) until the meter timer indicates it is time to bill (step 630=YES). A record of the metered resource usage is then sent to the resource provider (step 632), and the resource provider then sends a bill for the metered resource usage to the customer (step 634). Note that when a resource is configured to a dedicated partition (step 610=YES), the resource is considered to be 100% in use regardless of the actual usage in the dedicated partition. Therefore, every actual minute the resource is dedicated to a partition is a resource-minute that is charged to the customer. This is why a meter time is started in step 620, and why the record of metered usage in step 632 is the resource multiplied by the time elapsed on the meter timer. In this sense, method 600 is similar to method 200 in FIG. 2 that bills the customer according to the time a resource is enabled regardless of its actual use. This type of billing makes sense for logical partitions that have dedicated use of a resource, because that resource is unavailable for other logical partitions to use.

If the resource is allocated by the partition manager as a shared resource (step 610=NO), multiple logical partitions may use the shared resource (step 640). We assume a threshold value for shared use is specified. As long as the shared use does not exceed the threshold (step 650=NO), no time is metered. Only when the shared use exceeds the specified threshold (step 650=YES) does the capacity manager meter the shared use, and then only the shared use over the threshold is metered (step 652). Once it is time to bill (step 660=YES), the record of metered resource usage is sent to the resource provider (step 662), and the resource provider sends a bill for the metered resource usage to the customer (step 664).

The threshold that determines when the customer is charged is preferably determined by the capacity of the system before the temporary resources were enabled. For example, if one processor is allocated to the shared pool for five shared partitions that are configured for equal access to the pool, each of the partitions can use up to 20% of the processor clock cycles. Usage is averaged over a period of time and if any partition's usage exceeds 20% of the processor cycles, work from that partition is not dispatched to the processor before work from the other partitions, permitting the other partitions' usage to climb to their configured 20%. Now, let's assume that two additional processors are made available on demand. These two processors are initially marked available (step 606), and are then allocated as shared resources (step 610=NO). When the aggregate pool usage of processor clock cycles exceeds the amount one processor provides over an average time period, the additional cycles used are metered, and accumulate until a processor-minute's worth of cycles have been used and a processor-minute is charged to the customer. Of course, any suitable resource-time increment may be used. In this manner, different logical partitions may share a resource in a logically partitioned computer system and will only be charged according to their actual respective use of the resource. One advantage of the present invention is the ability of a logical partition service provider being able to determine which logical partition exceeded allocations (and so was metered) so the customer using metered capacity can be billed by the service provider.

Figure 7:
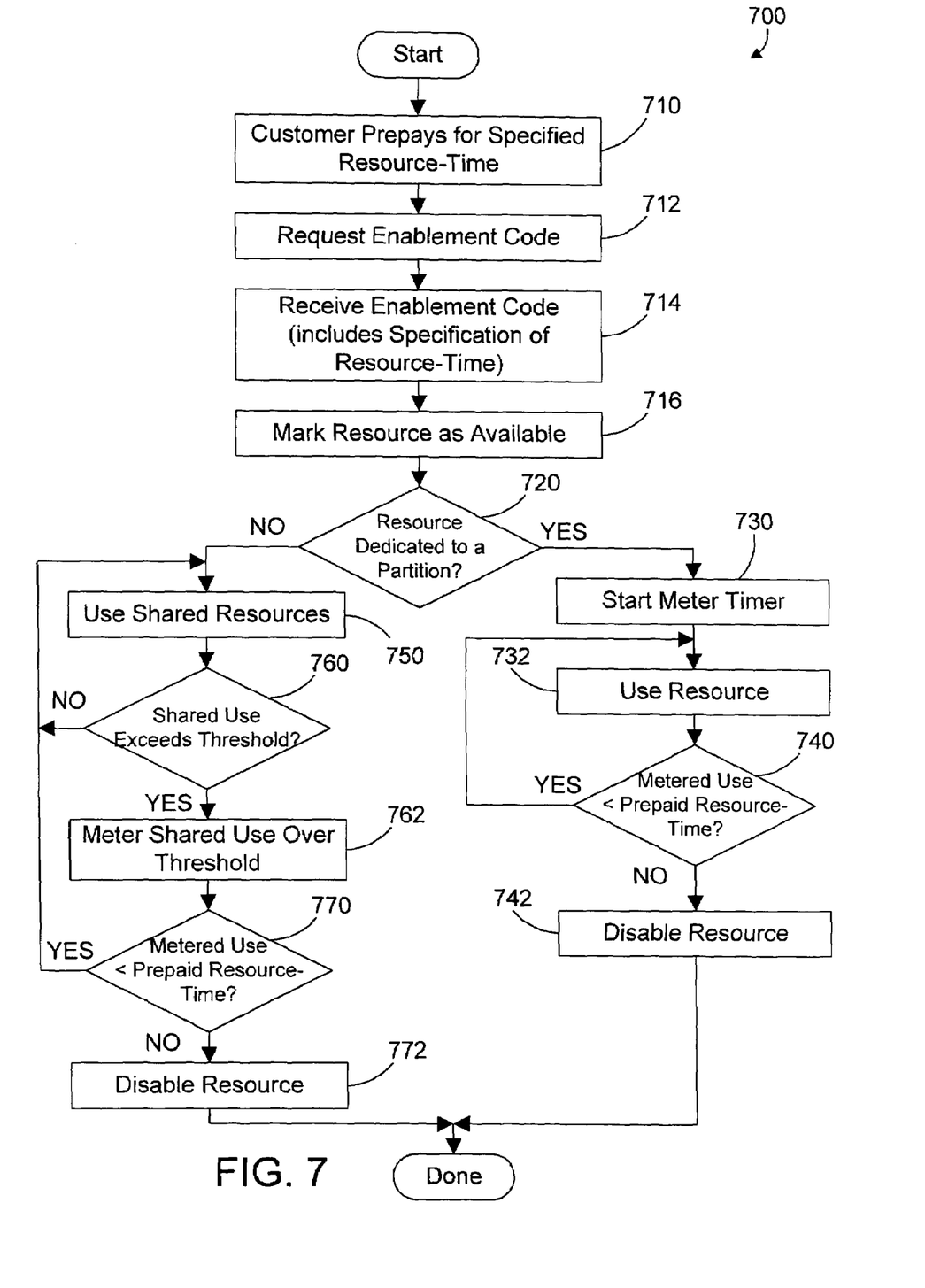
FIG. 7 is a flow diagram of a fourth method in accordance with the preferred embodiments that allows a customer to prepay for metered usage of temporary resources in a logically partitioned computer system.

Referring now to FIG. 7, a method 700 in accordance with the preferred embodiments shows the case when a customer prepays for resource-time (step 710) in a logically partitioned computer system, rather than being billed (as shown in FIG. 6). The enablement code is requested (step 712) and received (step 714), and the resource is made available for assignment to a logical partition (step 716). If the resource is dedicated to a partition (step 720=YES), the meter timer is started (step 730), and the resource is used (step 732) until the metered use equals the prepaid resource time (step 740=NO). At this point, the resource is disabled (step 742). If the resource is shared among logical partitions (step 720=NO), the shared resources are used by the logical partitions (step 750). When the shared use exceeds the specified threshold (step 760=YES), the actual usage over the threshold is metered (step 762), and the metered use is compared to the prepaid resource-time. Once the metered use is equal to the prepaid resource-time (step 720=NO), the resource is disabled (step 772) such that no new work is dispatched to the processor. Note that method 700 could include steps that allow renewing the prepaid time so the resource metered use never arrives at the prepaid resource-time, thereby preventing the resource from being disabled.

The preferred embodiments provide significant advantages over the known prior art. Now temporary capacity on demand may be provided on a metered basis, where the customer is only charged for actual usage of the resource. This is analogous to a telephone bill or electric bill, where the customer pays based on actual usage of resources. The ability to meter and bill based on actual usage provides enhanced capabilities in a logically partitioned computer system, because logical partitions that share resources may now each be charged for only actual usage of the shared resources. Because actual usage may now be metered and billed, the level of granularity for charging customers is reduced. For example, instead of billing for processor-days, one could bill for processor-minutes, processor-seconds, or even processor cycles.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A computer-implemented method for providing metered capacity of at least one temporary resource on demand in a computer system that includes a plurality of logical partitions, the method comprising the steps of:

providing at least one processor in the computer system;

providing a network interface coupled to the at least one processor that allows the computer system to communicate with other computer systems;

requesting an enablement code from a resource provider for the computer system;

receiving the enablement code from the resource provider, wherein the enablement code includes a specified resource-time for a selected resource;

enabling the selected resource for use;

when the selected resource is dedicated to one of the plurality of logical partitions, performing the steps of:

starting a meter timer;

using the selected resource until a time to bill occurs;

sending a record of metered usage to the resource provider based on value of the meter timer; and the resource provider sending a bill for the metered usage of the selected resource to a customer;

when the selected resource is not dedicated to one of the plurality of logical partitions and is shared between first and second logical partitions, performing the steps of:

the first logical partition using the selected resource without charge until the metered use of the selected resource by the first logical partition exceeds a first predetermined non-zero threshold that specifies allowable usage of the selected resource by the first logical partition;

metering use of the selected resource by the first logical partition that exceeds the first predetermined non-zero threshold until a time to bill occurs;

sending a record of metered usage of the selected resource by the first logical partition that exceeds the first predetermined non-zero threshold to the resource provider;

the resource provider sending a bill for the metered usage of the selected resource that exceeds the first predetermined non-zero threshold to the customer;

the second logical partition using the selected resource without charge until the metered use of the selected resource by the second logical partition exceeds a second predetermined non-zero threshold that specifies allowable usage of the selected resource by the second logical partition;

metering use of the selected resource by the second logical partition that exceeds the second predetermined non-zero threshold until a time to bill occurs;

sending a record of metered usage of the selected resource by the second logical partition that exceeds the second predetermined non-zero threshold to the resource provider; and the resource provider sending a bill for the metered usage of the selected resource that exceeds the second predetermined non-zero threshold to the customer.

2. A computer-implemented method for providing metered capacity of at least one temporary resource on demand in a computer system that includes a plurality of logical partitions, the method comprising the steps of:

providing at least one processor in the computer system:

providing a network interface coupled to the at least one processor that allows the computer system to communicate with other computer systems:

prepaying for a specified resource time;

requesting an enablement code from a resource provider for the computer system;

receiving the enablement code from the resource provider, wherein the enablement code includes the specified resource-time for a selected resource;

enabling the selected resource for use;

when the selected resource is dedicated to one of the plurality of logical partitions, performing the steps of:

starting a meter timer;

using the selected resource while the metered use is less than the prepaid specified resource time; and when the metered use is no longer less than the prepaid specified resource time, disabling the selected resource;

when the selected resource is not dedicated to one of the plurality of logical partitions and is shared between first and second logical partitions, performing the steps of:

the first logical partition using the selected resource without charge until the metered use of the selected resource by the first logical partition exceeds a first predetermined non-zero threshold that specifies allowable usage of the selected resource by the first logical partition;

metering use of the selected resource by the first logical partition that exceeds the first predetermined non-zero threshold while the metered use is less than the specified allowable usage of the selected resource by the first logical partition; and when the metered use is no longer less than the specified allowable usage of the selected resource by the first logical partition, disabling the selected resource for the first logical partition;

the second logical partition using the selected resource without charge until the metered use of the selected resource by the second logical partition exceeds a second predetermined non-zero threshold that specifies allowable usage of the selected resource by the second logical partition;

metering use of the selected resource by the second logical partition that exceeds the second predetermined non-zero threshold while the metered use is less than the specified allowable usage of the selected resource by the second logical partition; and when the metered use is no longer less than the specified allowable usage of the selected resource by the second logical partition, disabling the selected resource for the second logical partition.

* * * * *

UNITED STATES PATENT AND TRADEMARK OFFICE
CERTIFICATE OF CORRECTION

PATENT NO. : 7,627,506 B2 Page 1 of 1
APPLICATION NO. : 10/616676
DATED : December 1, 2009
INVENTOR(S) : Birkestrand et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1199 days.

Signed and Sealed this

Second Day of November, 2010

David J. Kappos
*Director of the United States Patent and Trademark Office*